April 16, 1940.   H. F. HAGEMEYER   2,197,213
MOLDING METHOD AND APPARATUS
Filed May 5, 1938   3 Sheets-Sheet 1
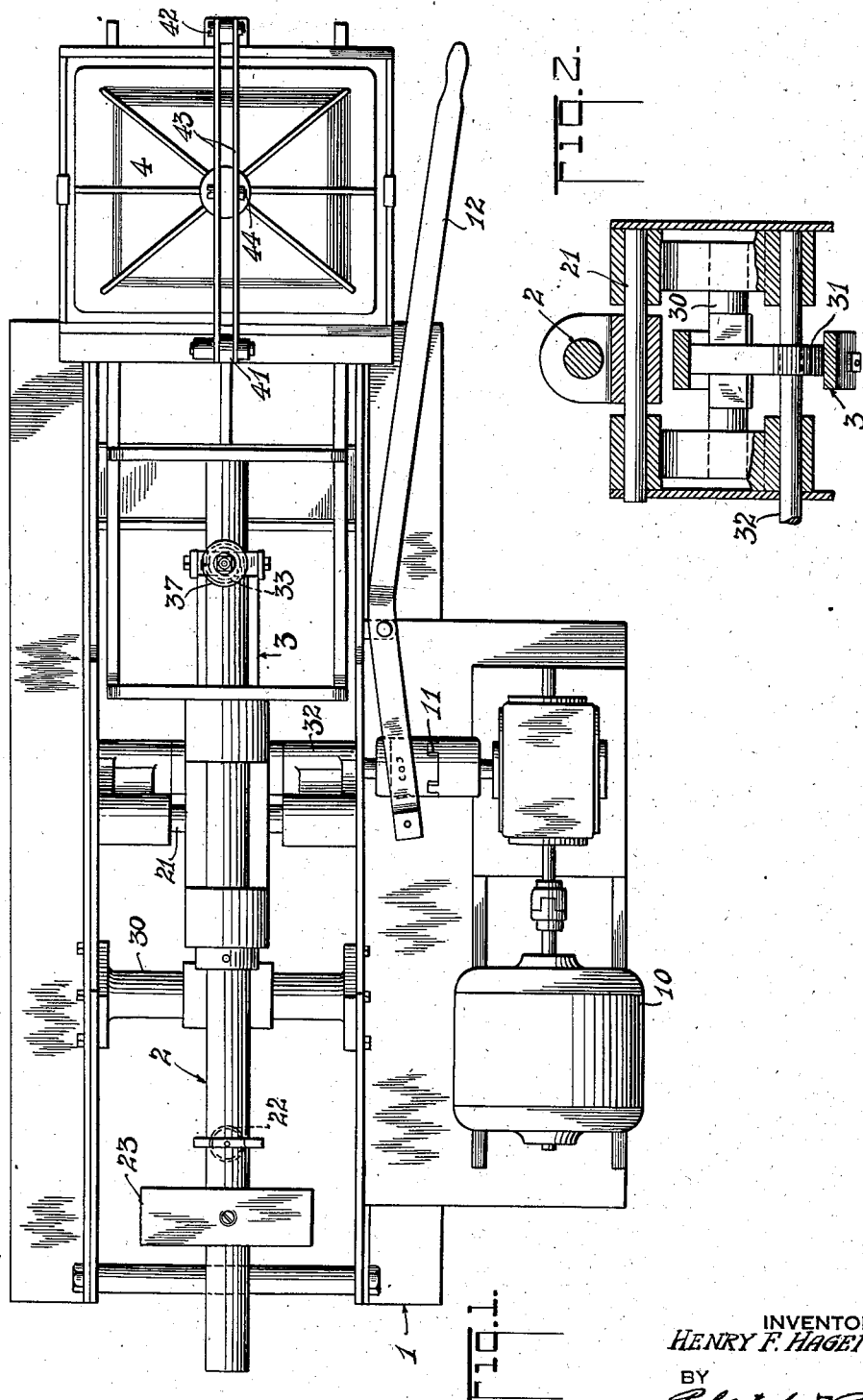
INVENTOR
*HENRY F. HAGEMEYER*
BY
ATTORNEY

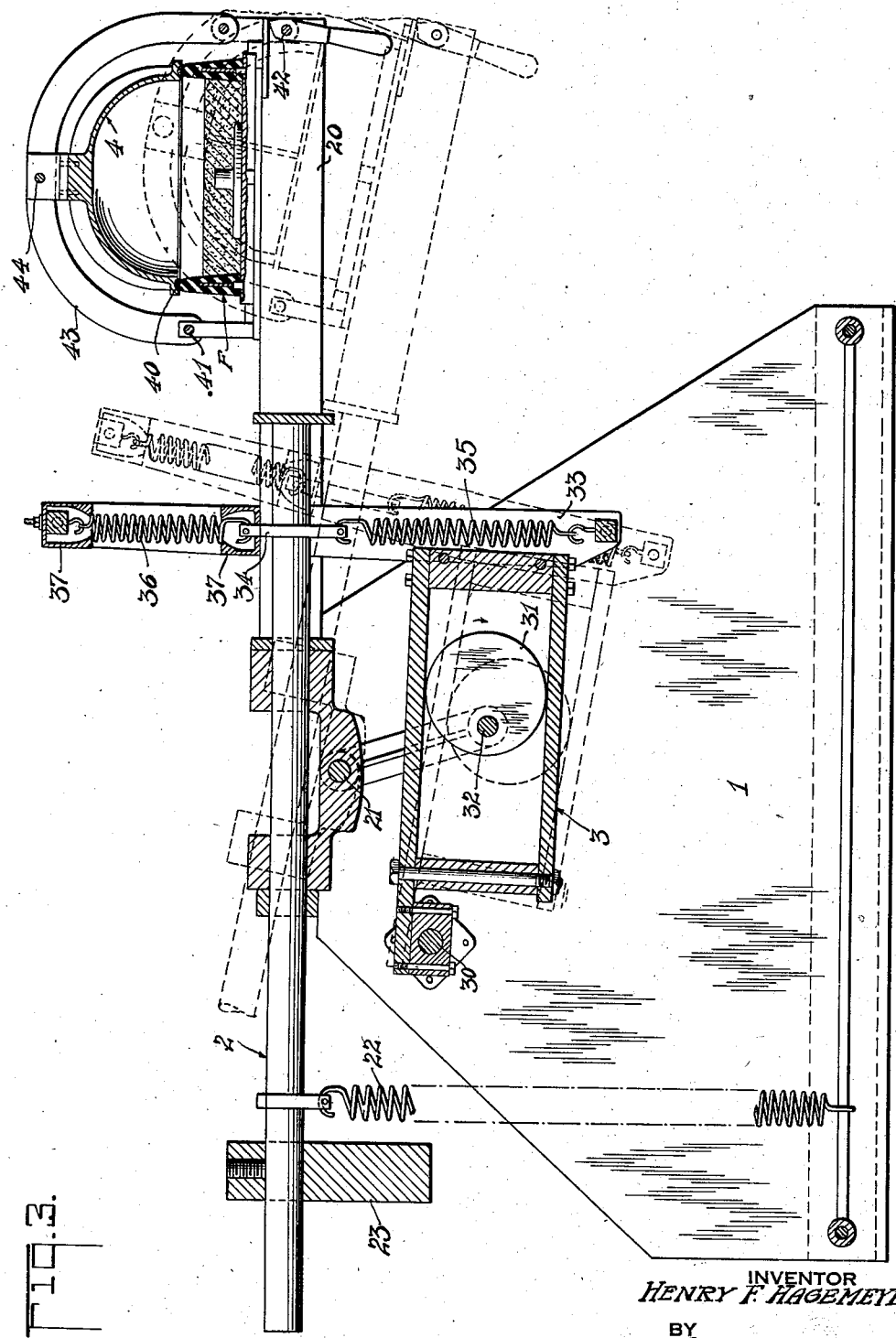

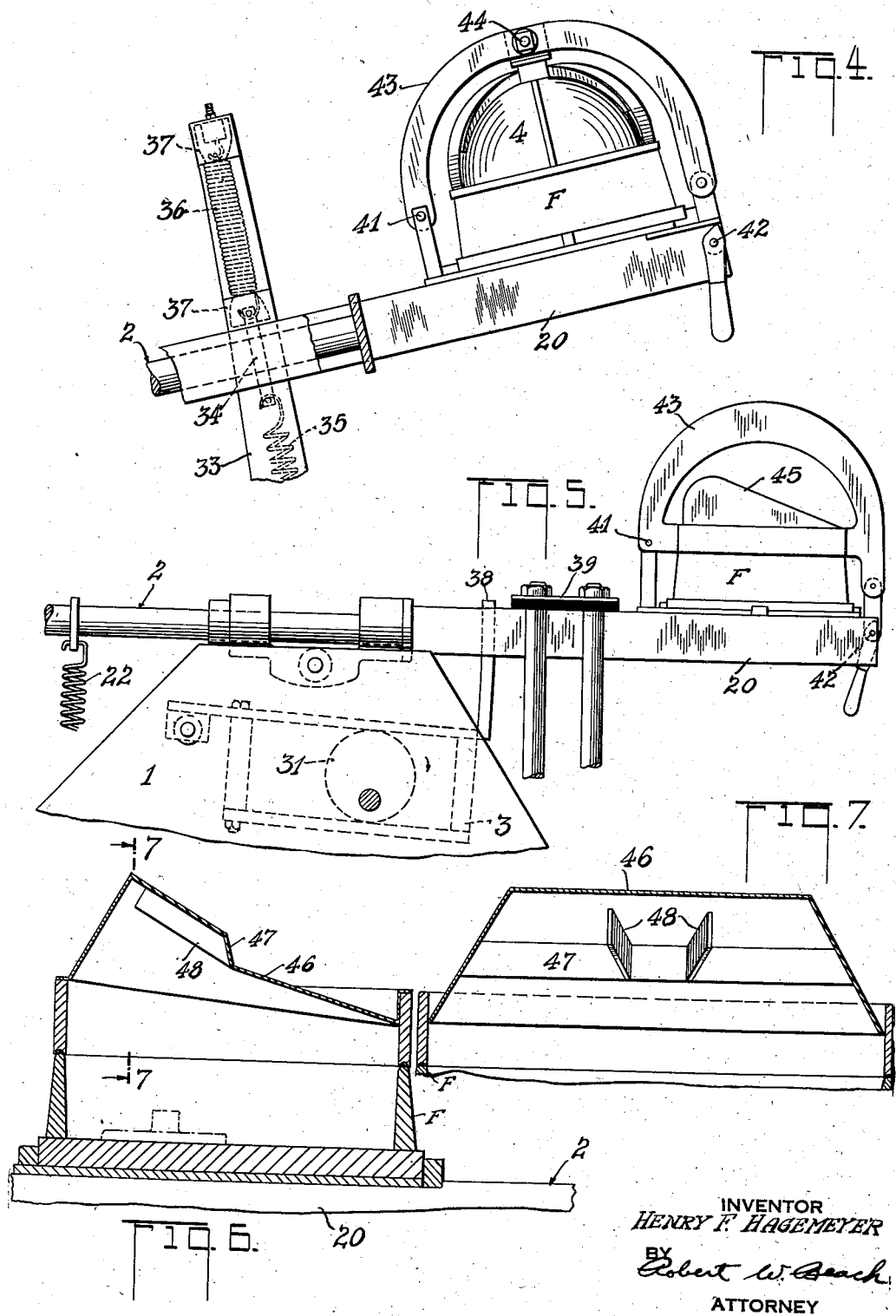

Patented Apr. 16, 1940

2,197,213

UNITED STATES PATENT OFFICE 2,197,213

MOLDING METHOD AND APPARATUS

Henry F. Hagemeyer, Chicago, Ill., assignor to Castings Patent Corporation, a corporation of Illinois Application May 5, 1938, Serial No. 206,152

16 Claims. (Cl. 22—45)

This invention relates to molding apparatus, and is particularly adapted for making molds of the gypsum base type by the method described in my application Serial No. 203,872, filed April 23, 1938, for Molding processes. This application is a continuation in part of my application Serial No. 87,922, filed June 29, 1936, for Molding apparatus.

In my application for molding processes, mentioned above, I have described a method of making molds having a very porous body by the use in the investment mixture of a large excess of liquid, which is subsequently dried out of the set mold to leave voids aggregating several times the volume of the skeleton of solid material. One of the chief problems in the performance of such a method is to obtain an intimate, homogeneous mixture of the excessive amount of liquid and solid material, and to accomplish setting of the gypsum in such mixture while the solid material, that is, gypsum and perhaps a strengthening substance such as asbestos, remains in uniform suspension in the liquid.

As a specific example of a satisfactory plastic molding mixture I may combine with one hundred parts of dry material, composed of eighty percent (80%) calcined gypsum and twenty percent (20%) asbestos pulp, one hundred sixty parts of water, all by weight. In simple figures this would be four parts of calcined gypsum to one part of asbestos to eight parts of water, the proportion of calcined gypsum to water being one to two. This proportion may be compared with the minimum water required for setting of the gypsum, which is less than one-fifth the weight of calcined gypsum, as pointed out in Toman Patent No. 1,893,309, issued January 3, 1933.

I have found that setting of a mixture of such ingredients with the large excess of liquid can be obtained while it is in a homogeneous state by subjecting the mixture to a violent churning or turbulent action coupled with concussion. Heretofore it has been deemed impossible to obtain sufficiently quick setting of such a thin mixture of calcined gypsum, asbestos and a large amount of liquid, for example, water, to produce a homogeneous mold of uniform density or hardness, as pointed out in the Pack patent, No. 1,301,965, issued April 29, 1919. It is essential that the stability of the mixture be sufficient, and that the initial stages of solidification of the gypsum take place sufficiently quickly, to enable the mixture to retain its homogeneity between the time of mixing and the final set.

It is therefore my principal object to provide a method of obtaining in a mixture of calcined gypsum, and perhaps a strengthening material, with a very abnormal excess of water, or other liquid, over that usually used in gypsum mixtures, sufficient stability and quick set properties to maintain homogeneity of the mixture until the gypsum is completely set, and to devise apparatus for performing such method.

It is a further object to provide such a method and apparatus which will enable the liquid contents of a homogeneous gypsum base mixture to be very much higher than has been utilized in the use of known mixing, agitating or jogging methods and apparatus.

Still another object is to enable such mixtures to be obtained quickly and to provide apparatus capable of performing the required operations with facility.

It is also an object to obtain by mechanical means an action which will subject the material to sufficient circulation and turbulence to obtain homogeneity of the mixture as quickly as possible.

Moreover, for obtaining a metal casting mold it is an object to attain all these results in a container provided with a match plate but without packing of the material onto the match plate or disrupting the film of separator fluid normally protecting its surface and serving to prevent direct contact of the molding material therewith.

Other objects will appear in the discussion of my particular apparatus devised to perform the mixing method.

My invention embraces both method and apparatus, those constructions shown in the drawings serving to illustrate the principles to be embodied in apparatus for performing my method, the inventive features both of the process and of the apparatus being pointed out in the appended claims.

Fig. 1 is a plan view of one form of my machine,

Fig. 2 is a transverse section of the upper portion of the machine showing parts in one extreme position, Fig. 3 is a longitudinal section of the machine, Fig. 4 is a fragmentary elevation view of the machine in the extreme position of Fig. 2, showing parts in section, Fig. 5 is a partial side elevation of a modified form of machine, Fig. 6 is a longitudinal section, and Fig. 7 is a transverse section on line 7—7 of Fig. 6 of a portion of a still further modified form of my machine.

In obtaining the homogeneous mixture of calcined gypsum, asbestos, if used, and the greatly excessive amount of liquid, preferably water, by what I term a hydrating operation, I impart to the assembled ingredients a violent churning or turbulent action and simultaneously a concussion. It has been my experience that the concussion action is necessary to obtain universal initiation of the solidifying action of the gypsum sufficiently promptly after cessation of the mixing to prevent stratification of the ingredients by settling of the solid material from the liquid, and thus to preserve the homogeneity of the mixture during setting of the gypsum, where a great excess of liquid is present. I have also found that the greater the concussion the higher the proportion of water which may be used in the mixture, presumably because of the further increased solution of the gypsum in the water and the more universal and intimate distribution through the mass of seed crystals of gypsum. Such seed crystals may be the result of a flash set, from gypsum deposits on the apparatus, and from small crystals in the mix. The violent mixing and the concussion incidentally assists in the removal of air bubbles from the mixture.

I have found that the proportion of water or liquid to the calcined gypsum or dry material may be still further increased by a double hydration. This is performed by subjecting the mixture to an initial churning and concussion action, letting the material rest for from a half a minute to a minute, to permit slight initial crystallization, and then subjecting the mixture to a final churning and concussion action to break up and distribute through the mass as seed crystals the crystalline clusters formed during such rest period. I have also found that if the mixture is hot, in the neighborhood of 160° F. to 180° F. a more thorough mixing and crystal distribution action is obtained.

In the making of porous molds for casting metal of gypsum material the hydrating operation may be carried out after the ingredients have all been placed in the mold form, consisting preferably of an integral flask and match plate unit, or the material may be hydrated first and thereafter poured into the mold form or otherwise applied to the pattern. Because of the convenience of the operation and the handling and time saved thereby, I prefer ordinarily to hydrate the material in the flask, and the apparatus illustrated has been designed with this operation in mind, but it is to be understood that the hydrating need not be done in the flask.

In the hydrating operation it is to be borne in mind that the more important consideration is the concussion. It is also necessary, however, to provide sufficient turbulence or churning of the material to insure a homogeneous mixture, which may entail the provision of mechanism to produce a circulation of the material. On the other hand, if the concussion is obtained in such a way and is sufficiently great to induce too much circulation with insufficient turbulence, precautions may be required to restrain the tendency of the material to circulate under the action to which it is subjected to obtain the desired concussion, and to increase local disturbance of the mixture.

Where the mixture is hydrated directly in the mold form provided with a match plate, precautions must also be taken to control the concussion so that the material at the surface of the match plate will not be more compact or denser than the main body thereof, so that by the use of such precautions the mold, when set, will be of uniform hardness throughout, and hence, when dried, will be of uniform porosity. Furthermore, the material must not be flung against the match plate with sufficient force to rupture the film of separator fluid conventionally used to keep the mold material from adhering to the pattern. As the severity of the concussion increases the danger of these effects occurring is increased. I prevent these results by causing all concussive forces to be exerted on the material in the direction away from the match plate, and at a distance therefrom such that there will be insufficient rebound to be detrimental.

In hydrating the mixture in the mold form I prefer to have the match plate on the bottom and to have the concussive force on the mold material exerted in an upward direction. This operation enables the hydrating action to be carried out with the match plate and flask rim upstanding therefrom, containing the mold material, to be retained at all times in its normal position. In some cases, however, it may be desirable to invert the flask during the hydrating operation, and to subject the molding material to the concussive force in the downward direction, which in this instance also is in the direction directly away from the match plate. The churning action on the material would not be as great during an operation of the latter type, however, and it is therefore not preferred.

One machine which I have employed to perform the hydrating process is illustrated in Figs. 1 to 4, inclusive. On the base 1, including parallel vertical side plates, is mounted a drive motor 10 operating through suitable reduction gears and connected to the hydrator drive mechanism by the clutch 11 which is engaged and disengaged by the clutch control handle 12.

The container for the material to be hydrated, represented as the flask and match plate F, is carried on a cradle 20 on the end of arm 2 which is supported by and swings about the bearing shaft 21 mounted between the side plates of the base 1. The cradle is oscillated upward and downward by the drive mechanism through the medium of the rocking box 3, also supported by and swingable about a bearing shaft mounted between the side plates of the base 1, designated 30. Within the rocking box and in contact with at least the bottom thereof is an eccentric 31 which is keyed to shaft 32, journaled in the side plates of the base 1, and for structural reasons further journaled in fixed bearing links in which shaft 21 is also journaled. The shaft 32 projects through the side plate adjacent to the motor 10 and carries one element of the clutch 11 so that it may be rotated at will by the drive mechanism to turn the eccentric 31 which moves the rocking box 3.

The swinging end of the rocking box 3 carries the yoke 33 which extends upward above the arm 2 a distance approximately equal to the length thereof below the arm 2, and has plenty of clearance either side of the arm. Secured upon the arm in line with the yoke 33 is a collar or bearing ring 34 which is connected to the lower end of the yoke by a tension spring 35 and to the upper yoke end by a tension spring 36 so that the bearing ring resiliently floats normally midway between the two yoke ends. At the connections of spring 36 to the yoke and bearing ring are members against which the end coils of the spring may engage upon full compression of the spring. These members are illustrated as cups 37 secured to the yoke and bearing ring, respectively, shrouding the spring connections and having mouths extending inwardly sufficiently to be engaged by the spring's convolutions.

Between a collar or other suitable fastening on the end of arm 2 remote from the cradle 20 and the base 1 is connected a tension spring 22. A counterbalancing weight 23 may also be secured to this end of the arm, if desired, to assist in balancing the weight of the flask and its cradle mechanism on the opposite end of the arm. The spring 22 exerts a turning moment upon the arm 2 about shaft 21, which is transmitted through the spring 35 and yoke 33 to the rocking box 3, to maintain the lower side thereof in engagement with the eccentric 31.

For holding the molding material container against lateral displacement suitable flanges, cleats or spring clips may be provided on the cradle 20. The container or flask F is then held down in contact with the cradle by clamping thereover a domed cover 4 having a sealing gasket 40 which forms a fluid tight joint with the flask rim to constitute a closed receptacle. This cover may be hinged at 41 on one side and have any suitable lock such as 42 at the other side to secure the flask upon the cradle 20 when the cover has been swung down upon it. The cover may, instead of being hinged, merely be slightly reciprocable vertically and be clamped down upon a flask or other container after it has been slid into place. In order that the cover may always seat squarely on the container wall the hinge 41 and lock 42 may be carried upon opposite ends of an arcuate girder 43 which supports the cover through pivot 44.

In operation, as the clutch 11 is engaged by lever 12 with the parts in the position shown in solid lines in Fig. 3, the shaft 32 and hence the eccentric 31 will be driven in a clockwise direction. The rocking box 3 will thereby be depressed and the yoke 33 will be drawn downward to tension spring 35. As its tension is increased it will exceed that of spring 22 and that end of arm 2 carrying cradle 20 will be drawn downward, the tension of both springs 35 and 22 progressively increasing, that of the former always being slightly the greater. During this downward movement into the broken line position of Fig. 3 the mold material within the flask F will wash downward across the pattern toward the end of arm 2.

As rotation of the eccentric is continued beyond dead center the tension of spring 35 is progressively relaxed, and preferably rather suddenly, by the upward movement of rocking box 3. The energy stored in spring 22 will then cause it to contract, upon release of the balancing tension of spring 35, and such contraction, aided somewhat by the spring 36, will cause the flask carrying end of arm 2 to be raised rapidly. Upward movement of the flask continues until the eccentric reaches the opposite extreme position. The momentum created by such upward movement, aided by spring 22, will carry the flask on up to the position of Fig. 4 wherein, despite the increased tension of spring 35, raising of collar 34 by the arm 2 has caused complete compression of spring 36, which, becoming a solid column between cups 37, acts as a positive stop for the upward movement of the flask through the yoke 33, rocking box 3, eccentric 31 and fixed shaft 32.

It will be seen that the shock of impact with the solid spring column 36 will be somewhat cushioned since, as arm 2 continues its upward movement after yoke 33 has reached its uppermost position, spring 35 will be drawn to its position of maximum tension as spring 36 is compressed to a solid column. Rebound from the sudden stoppage will be damped by both springs 22 and 36. Upon the downward movement the momentum of the flask will never be sufficient to close the coils of spring 35 since spring 22, instead of aiding such momentum as it does during the upward movement, will be opposing it, and such opposing force will be great because the spring 22 will be in its position of maximum tension. Thus while at the end of the upward movement the flask will be subjected to a sudden stop and jar the reversal from downward to upward movement will be no more than a slight snap, since the momentum of the arm 2 and parts carried thereby is damped by the spring tensions both of spring 22 and of spring 36, and these will aid in initiating a quick return movement.

It will therefore be evident that upon moving upward from the broken line position of Fig. 3, wherein the molding mixture has flowed to the front of the flask because of its tilt, the mixture will be torn between two forces, that of gravity urging it to the rear as the flask tilts into the position of Fig. 4, and the centrifugal force urging it forward toward the swinging end of the arm. The latter force predominates, and hence most of the material is toward the front of the flask as it reaches the uppermost position of Fig. 4.

As the flask or container is brought to the sudden stop in the position of Fig. 4, the momentum of the material will carry it on upward into the hydrating space within the domed cover and into impact therewith, thus subjecting it to the concussion necessary for carrying out my process as explained heretofore. In addition the cover 4, as shown, is domed instead of being merely a flat plate. This domed shape is provided to guide the material, as its inertia causes it to continue upward to impact the cover surface at an acute angle thereto, in a circulating path first rearward along the cover surface and then downward to the rear portion of the flask, to flow forward again across the pattern as the flask moves downward again into the broken line position of Fig. 3. A flat cover would not guide the material for such circulation. The distance between the match plate and the cover should be small enough so that an effective concussion of the material is obtained, but should be great enough so that the material will not be driven or compacted against the match plate by rebounding from impact with the cover.

A symmetrically domed cover like 4 is also advantageous when the flask, instead of oscillating, reciprocates upward and downward in a straight line. In this instance, upon impact with the cover surface at an acute angle thereto, the material at the sides moving upward would be deflected along the cover surface toward the center to drop downward and displace the central material outward toward the edges. In both reciprocating and oscillating movements, however, it will be seen that the material is subjected not only to concussion but undergoes a positive circulating and turbulent action over the entire area of the flask to bring all parts of the material in the course of several cycles into intimate commingling contact. The number of cycles through which the material passes is, of course, under control of the operator by means of the clutch control lever 12. Ordinarily, eight to twelve cycles is sufficient to complete the hydrating operation, at the rate of 50 to 85 cycles per minute. In the double hydrating method described each hydrating operation should consist of eight to twelve cycles.

While the employment of the balancing springs 35 and 36 is advantageous in certain operations they are not at all essential. In Fig. 5 I have illustrated a hydrating machine in which the rocking box 3 is connected directly to the oscillating arm 2 by a rigid yoke 38. The engagement between the arm and yoke may be somewhat shock absorbing, if desired, to protect the driving mechanism, by incorporating in the joint a rubber bushing or pad. The solid column spring type of stop is replaced in this machine by a solid stop plate 39 rigidly connected to the base 1 by rods or other suitable tie members, and cushioned with rubber where it is engaged by the arm.

The shape of the domed cover 45 is also somewhat different in the machine of Fig. 5, and it is integral with the girder 43 instead of pivotally supported thereby. In this instance the dome is highest at the rear so that the material will be given a greater mixing circulatory motion in proportion to the violence of the impact than where a symmetrical cover is used. If the impact is relatively slight the required circulation is obtained by this shape of cover which guides the rising material, upon its impact with the cover at an acute angle to it, with comparatively little momentum along the cover surface clear to the rear of the flask without interruption, by its upward and rearward inclination. If a harder impact is used the symmetrically domed cover 4 is more suitable, since instead of the material falling as it reaches the highest point at the center, its greater momentum will carry a large part of it on over to the rear of the flask, following the cover surface.

If a very great impact is obtained, however, both covers 4 and 45 may enable the material to have too great a circulatory motion, which may be just as bad as too little. Greater concussion is required especially in the double hydration process, or where a relatively large amount of material is being hydrated, or where a greater proportion of liquid is used in the mix. The aim is to produce, in addition to the concussion, a thorough churning of the material to obtain a homogeneous mixture. Sufficient circulation of the material must therefore be obtained to insure that every part thereof is mixed into the general mass. If the material obtains too great momentum, however, in a machine with a cover like either 4 or 45 it may move forward and upward, and then rearward and downward as a body under the successive forces of gravity, centrifugal force, and inertia, and have comparatively little local agitation or turbulence, resulting in insufficient internal churning of the mass just as though it had been subjected to very little movement.

Where an impact of sufficient violence to induce momentum of this order is obtained, resort may be had to a cover such as 46, shown in Figs 6 and 7. Here the high point of the dome is toward the front, which, with the angular instead of rounded corners, and the downward step 47 tends to impede the bodily rearward movement of the mass of material under the urge of its high upward momentum. Instead, the material tends to diffuse by a spattering action, the gravitational movement of the material across the pattern as the flask or container descends, and its tendency to consolidate at the front of the flask under the action of the greater centrifugal force during upward movement, being sufficient to collect the segregated portions together periodically in continuously changing relationship, thus obtaining the requisite intermingling.

The disseminating and commingling action on impact may be somewhat further increased, if desired, by the provision of converging fins 48 projecting downward from the cover plate. The material between the fins is thrown together and thus intermixed, while the material adjacent to the fins undergoes a double spattering action, first upward against the cover and second, being deflected by the cover, it impinges against the sides of the fins.

As my invention, I claim:

1. Molding apparatus, comprising means for holding a container having plastic molding mixture therein, means for rapidly moving said holding means in opposite directions alternately, means for suddenly checking the movements in one direction, means for cushioning the stoppage of the movements in the opposite direction, a cover for said container formed with a domed inner surface, and means for securing the cover to and rigid with the container with the inner surfaces spaced from the surface of the molding mixture.

2. Molding apparatus, comprising container holding means mounted for oscillation upward and downward, a spring anchorage member extending above and below said holding means, tension springs anchored to said member and to said holding means above and below the latter, respectively, whereby to float said holding means between said springs, a device to rapidly move said anchorage member alternately upward and downward, a container detachably secured to said container holding means, and a cover fixed upon said container during said movements, to be in spaced relation to the contents of the container whereby to churn said contents.

3. Molding apparatus comprising a frame, a beam pivotally mounted intermediate its ends in said frame, means at one end of the beam for detachably securing a container thereto, a cover for the container pivotally secured to the beam, and means for oscillating said beam including a pair of springs secured to said beam, and means mounted in said frame for alternately tensioning said springs, whereby said beam is oscillated around its pivot.

4. Molding apparatus, comprising a receptacle for plastic mixture having a domed ceiling spaced well above the surface of the molding mixture, means operating to move said receptacle continuously alternately downward and upward through an arc, and a stop operable to terminate abruptly upward movement of the receptacle to effect propulsion of the plastic mixture, by its upward momentum, into impact with the domed ceiling of the receptacle.

5. Molding apparatus, comprising a receptacle for plastic mixture having a domed ceiling highest along a line substantially midway between opposite sides thereof and spaced well above the surface of the mixture, means to move said receptacle alternately upward and downward, and a stop operable to terminate abruptly each upward movement of the receptacle to effect propulsion of the plastic mixture, by its upward momentum, into impact with the domed ceiling of the receptacle, to be deflected and guided thereby from such opposite sides of the receptacle toward the center.

6. Molding apparatus, comprising an arm, pivot means supporting said arm for oscillation upward and downward about a generally horizontal axis, means to oscillate said arm, a stop engageable by said arm to terminate abruptly upward movement thereof, and a receptacle for plastic mixture supported upon the swinging end of said arm, and having a domed ceiling highest along a line adjacent to the side of the receptacle remote from the swinging end of the arm, and inclined downward to the side of the receptacle next to the swinging end of the arm, thereby to deflect and guide to such former side of the receptacle plastic mixture propelled by its momentum upward into contact with the ceiling upon impact of the arm against said stop.

7. Molding apparatus, comprising an arm, pivot means supporting said arm for oscillation upward and downward about a generally horizontal axis, means to swing said arm downward, a stop engageable by said arm to terminate abruptly upward movement thereof, means to force said arm upward into violent impact with said stop, and a receptacle for plastic mixture supported upon the swinging end of said arm, and having a domed ceiling highest along a line adjacent to the side of the receptacle next to the swinging end of the arm, and inclined generally downwardly to the opposite side of the receptacle, said inclined portion of the ceiling being interrupted by an offset shoulder extending parallel to and intermediate the upper and lower edges thereof.

8. Molding apparatus, comprising a receptacle for plastic mixture having a domed ceiling, means to move said receptacle upward, a stop operable to terminate abruptly upward movement of the receptacle, to effect propulsion of plastic mixture, by its upward momentum, into impact with the domed ceiling of the receptacle, and a plate projecting downward from the ceiling, and being longitudinally inclined downward along the domed surface.

9. The apparatus as defined in claim 7, and two plates projecting downward from the ceiling, and extending divergently from the offset shoulder upward toward the highest portion of the dome.

10. Molding apparatus, comprising a mold form, including a match plate on one surface thereof, for reception of plastic molding mixture, a positive, mold cavity pattern mounted on said match plate, a support for said mold form, a cover to close said mold form, means operable to move said support alternately in the match plate foremost direction and then in the opposite direction, a stop operable to terminate abruptly movement of said support in such opposite direction to effect propulsion of the plastic mixture, by its momentum, into impact with said cover, and means to cushion stoppage of the support's movement in the match plate foremost direction to prevent substantial impact of the plastic mixture against said match plate.

11. Molding apparatus, comprising an arm, pivot means supporting said arm for oscillation, a receptacle for molding material supported upon one end of said arm, means to move the receptacle supporting end of said arm in one direction, a stop engageable by said arm to terminate abruptly movement of the receptacle supporting end thereof in the opposite direction, and strong spring means connected to said arm to force the receptacle supporting end thereof into violent impact with said stop at the end of its movement in such opposite direction, and to cushion the reversal of its movement at the opposite end of its oscillation.

12. Molding apparatus, comprising a frame, an arm, pivot means supporting said arm intermediate its ends from said frame, for oscillation about a generally horizontal axis, a receptacle for molding material supported upon one end of said arm, a stop secured to said frame and extending transversely above the same end of said arm for engagement thereby, eccentric means operable to move the same end of said arm downward, and strong spring means connected between the opposite end of said arm and said frame to force the receptacle supporting end of said arm upward into violent impact with said stop at the end of its upward movement, and to cushion the reversal of movement of the receptacle supporting end of the arm from the downward to the upward direction.

13. The process of molding, which comprises partially filling a mold receptacle having a matchplate floor and a domed ceiling with selected plastic-mixture ingredients, thereafter subjecting the partially filled receptacle to a succession of rapidly alternating upward and downward movements, suddenly arresting movement of the receptacle at the end of each upstroke to thereby throw the contained ingredients by their inertia into the unfilled receptacle space and against the domed ceiling, so as to cause the ingredients to be effectively commingled, and smoothly and relatively gradually stopping movement of the receptacle at the end of each downstroke, so as to minimize the pressure of the contained ingredients against the matchplate at the instant of reversal of movement from downward to upward.

14. The process of molding, which comprises placing together in a container dry material, including calcined gypsum, and liquid, including water, subjecting the container to bodily movement and suddenly arresting such movement, repeating such movement and sudden arresting thereof several times in quick succession, thereby mixing the contained ingredients and causing them to impact against the inside of the container, then maintaining the container stationary and the molding material quiescent for an interval of appreciable duration but insufficient to permit the mixture to lose its fluidity, again alternately subjecting the container to movement, and sudden arresting thereof several times in quick succession, thereby again mixing the contained ingredients and causing them to impact against the inside of the container, and finally maintaining the container and mixture quiescent until the gypsum has set sufficiently so that the mixture is no longer fluid.

15. The process of molding, which comprises placing fluid plastic molding material in a molding receptacle having a matchplate forming one wall thereof, moving the receptacle and suddenly arresting such movement to forcibly impinge the molding material only against surfaces of the receptacle remote from the matchplate wall thereof.

16. The process of mixing molding material, which comprises partially filling a container having a domed ceiling with dry material, including calcined gypsum, and liquid, including water, moving the container upward, suddenly arresting such upward movement of the container thereby to impel ingredients in the container by their inertia into the unfilled container space in a direction making an acute angle with the container ceiling and with a velocity sufficient to effect impact of such ingredients against the container ceiling, and, by such impact of these ingredients striking the ceiling at such an acute angle, deflecting such ingredients bodily along the ceiling in a direction away from such acute angle, for substantial, bodily, lateral displacement of such ingredients across the container bottom to be deposited on a portion thereof remote from that from which they were thus impelled, and thereafter repeating several times in quick succession the same sequence of movement and sudden arrest of the container, thereby thoroughly mixing the ingredients.

HENRY F. HAGEMEYER.